June 5, 1934.                L. THIRY                1,961,536
METHOD OF MANUFACTURING OSCILLATING JOINTS
Filed Nov. 22, 1930
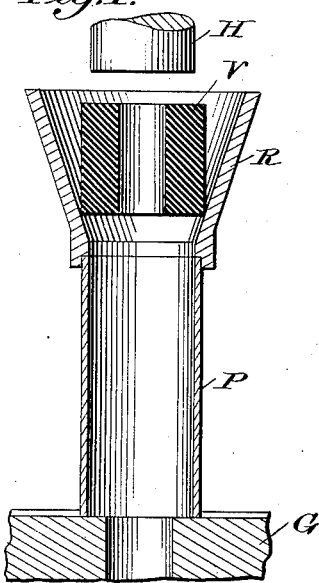
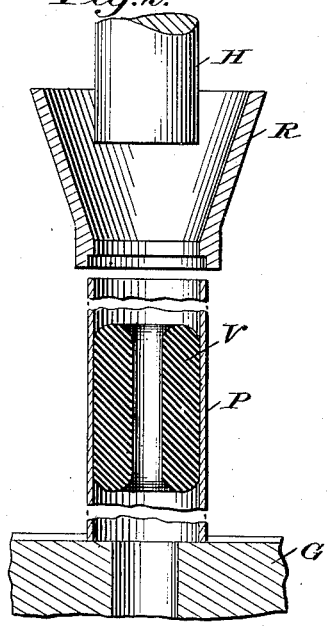
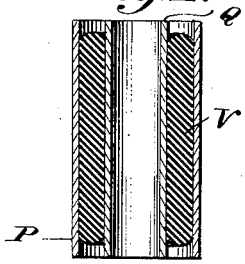
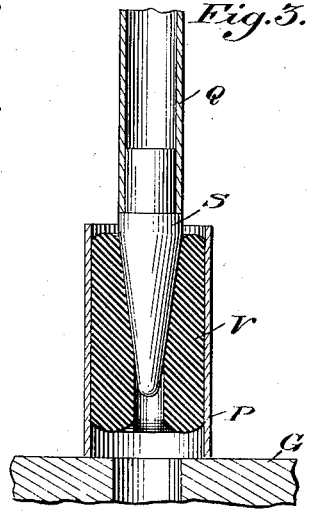
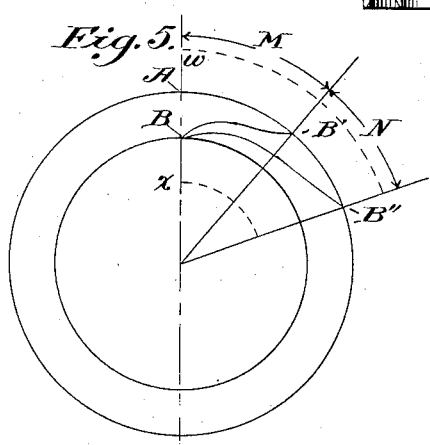
Inventor:
Leon Thiry,
by Langner, Parry, Card & Langner
Attys Patented June 5, 1934

1,961,536

UNITED STATES PATENT OFFICE 1,961,536

METHOD OF MANUFACTURING OSCILLATING JOINTS

Leon Thiry, Huy, Belgium

Application November 22, 1930, Serial No. 497,593
In Belgium November 25, 1924

1 Claim. (Cl. 29—88.2)

This application is a continuation in part of my application Serial No. 64,961, filed October 26, 1925, now Patent No. 1,782,770. This patent describes a pivotal oscillating joint, comprising a deformable material introduced by force between two members movable angularly with respect to each other.

In addition the said patent describes a method of manufacture of the joint, and in this connection it suggests the possibility of using a lubricant, citing by way of example water and soapy water. My Patent No. 1,739,270 relates to a method of carrying out this construction, comprising introducing the parts one into the other with great speed, with the possible use of a lubricant, water being cited by way of example.

A still further mode of manufacture of the construction of the said Patent No. 1,782,770 is as follows:—

In this new constructional method use is not made of just any lubricant at all regardless of type, but more especially there is employed a lubricant having a temporary action, that is to say losing its lubricating action for example in drying. In addition, this lubricant is used in sufficient quantity so that the members may be introduced one into the other with ease.

Moreover, the presence of the lubricant does not prevent the necessary adherence between the deformable material and the members of the joint, since the lubricating action of the lubricant, which is used in sufficient quantity to permit the use of only normal speed of introduction, is only temporary.

A particularly novel feature of the present invention is that the diminution of the lubricating action is accelerated, if the lubricating action is not totally stopped, by the manufacture itself of the joint.

During the insertion, the lubricant is spread out over a surface of the deformable material, which is increased in proportion to the amount that this material extends in a longitudinal direction.

Furthermore, this extension takes place by sliding between the deformable surface which elongates and the rigid surface of the members of the joint, this taking place at the same time that the pressure between the surface continues to increase. These different factors contribute to decreasing the lubricating properties of the lubricant, which also either has only a temporary action, or else has an action which becomes temporary when it is used under the conditions specified. Among lubricants of this type may be specified water, soapy water, paraffine, or mineral oil.

After the lapse of a short time interval following the insertion, these liquids, subjected to the high pressure resulting from the insertion of the elastic material no longer have an action tending to facilitate sliding.

It has been found that the use of soapy water to lubricate the parts of the joint during the insertion of the elastic material into its cooperating telescoping parts greatly facilitate the insertion, but after a certain length of time the soapy water disappears and the adhesion of the material to the two members of the joint after reasonable length of time has elapsed, is as efficacious as if no lubricant whatsoever had ever been employed. The elastic material itself being then in direct contact with the walls of the inner and outer members.

The invention provides a particularly useful device in the form of a pivotal joint for suspension springs and for spring shackles for vehicles and for other devices adapted for use in auto vehicular or other constructions.

The drawing accompanying the present specification, shows by way of example, one method of carrying out the invention.

Figs. 1, 2 and 3 are cylindrical sections, largely diagrammatic, showing a method of assembling the elastic block and the rigid joint members, Figure 1 showing the block in position to be forced into the outer member, Figure 2 showing it in position in the outer member, and Figure 3 showing the tapered mandrel spreading the axial aperture in the rubber block for the insertion of the inner rigid member.

Fig. 4 shows an oscillating joint made according by the method according to the invention.

Fig. 5 is a diagrammatic view illustrating how compression of the radial elements enlarges the capacity of the rubber for oscillatory displacement.

The amount of adherence to the walls of the inner and outer members is a function of the proportions of the external and internal diameters of the body of elastic material in the free and drawn out deformed state.

The chamber formed by the annular space is open in the directions in which the initial, that is axial, deformations are to be produced and great care is taken in proportioning the initial axial length of the rubber member to the degree of radial compression to which it will be subjected so that in its state of greatest axial deformation it will be entirely contained within the annular space defined between the rigid members of the joint, by which it is meant that the ends of the rubber member must in no case, extend beyond the confines of the two rigid members, in which extended position, said ends would not be under uniform radial compressive tension, but would be free of such tension and therefore incapable of deflecting responsive to oscillation of the joint, to the same extent as is the confined portion, and the projecting ends would also lack frictional adherence to the rigid member with which they make contact, so that slippage upon said member would occur, the result being generation of destructive heat, conducted by the metallic parts to the inside portions of the rubber.

In order to forcibly insert the deformable elastic material, use is made of the conical elements R and S, which cones are fitted to the members P and Q, as shown in Figures 1 to 3 the cone R is fitted to one of the ends of the outer member by means of its small base, while the cylindrical extension of the cone S will be inserted into the corresponding end of the inner member Q.

In the drawing there is illustrated a method by which an oscillating joint embodying the invention, may readily be assembled. The members P and Q and the rubber annulus V are first provided with a lubricating substance, such as soapy water, by being immersed therein, or sprayed therewith, or in any desired manner. The outer member P fitted with the funnel-like device R, is then placed on a firm support G, the annulus of rubber or other elastic material placed therein as shown, and by means of piston H forced into the position shown in Figure 2. Then as shown in Figure 3 the member Q, provided with the cone-like device S as a guide is forced into the small central concentric opening in the elastic material. The opening in the support G is of sufficient diameter to permit the device S and lower end of Q to be inserted as far as may be necessary or desired. The lubricant, water or soapy water, used assists in the insertion of the material between the members P and Q, and prevents sticking and possible destruction of the surface fibers of the deformable material.

After the parts have been placed in position the completed joint is set to one side and permitted to dry. When first completed a slight slipping between the rubber insert and the two members is possible but it has been found that after a lapse of about ten hours the soapy water entirely disappears and the rubber insert then rigidly adheres to the surfaces of the inner and outer members with which it is in contact. It is thus emphasized that the purpose and effect of the use of the lubricant such as soapy water is merely temporary.

It is to be noted that the insertion of the mandrel supplements or increases the compression of the rubber first effected by the forcing of the rubber member into the outer member, the radial compression causing a compensating axial deformation of the rubber which is able to take place axially in both directions, thus ensuring uniformity in the compressive stress to which the radial elements of the rubber are subjected, from one end of the rubber member to the other, ensuring the insertability of the rubber member at very high pressure. In order that the inner member may remain centralized under heavy loads, it is essential that the rubber be compressed radially to a state of substantial rigidity, and if there is not a substantially perfect freedom of movement for the material to deform axially, it jams against the surface between which it is being squeezed, adjacent the forcing means with destructive friction which makes it impossible to insert the rubber at requisite high pressure.

The diagrammatic showing in Figure 5 illustrates the principle of the rather paradoxical phenomenon that notwithstanding the radial compression with proportionate axial stretching of the rubber, no matter to what extent such compression is carried, not only is the capacity of the rubber for oscillatory deformation not restricted, but on the contrary, it is enhanced to a remarkable degree. The original thickness of the rubber block, is indicated by the broken lines $w$ and $x$. This is reduced by the radial compressive stress imposed upon the rubber to one third of its original value as indicated by the line A B.

This means that the radial element represented by the latter line is capable of extending itself three times its own length before beginning to stretch. This is true of each and every radial element. Therefore, when the joint oscillates each radial element assumes its original state of repose by lengthening three times its original length, being at the same time disposed in a spiral direction through the circumferential displacement of the parts of the joint. The angle of oscillation through which the radial elements are merely permitted to extend to their original length is represented at M, and up to this point there has been no stretching of the rubber, the radial elements of which have merely recovered the original length which they had before being shortened through the forcing of the rubber member into the joint. Beyond the angle M the radial elements are capable of being extended through a further angle N by being stretched, this being the only portion of the entire angle of deflection of the joint in which the radial elements are stretched.

Now, it is obvious that if the compressive tension of the radial elements is not substantially uniform from end to end of the rubber member, they will have different potential capacities for extensibility, and at different cross sections, taken perpendicular to the axis of the joint, the part M of the entire angle of deflection of the joint will vary, having a greater value at cross sections where the radial elements are under relatively high compressive stress and having a lower value at points where the radial elements are under less compressive stress, the result being that the complementary parts N of the entire angle of deflection will be correspondingly varied, representing unequal stretching of the radial elements at different cross sections. By this unequal stretching of the rubber in different parts, destructive internal heating would arise which is avoided by the principle of the present construction.

It is to be noted that in a general manner the deformed material also permits small relative displacements to take place in the direction of the deformations of the said material, the magnitude of these small relative displacements depending upon the amount of the above mentioned initial deformations. For instance, when the invention is applied to an oscillating joint, as shown in Figure 1, the inner member may partake of small transverse movements, relative to the outer member. The use of these small transverse displacements is seen in certain cases of application of the invention in which it is necessary not only to provide for the angular displacement or oscillations between the members, but also to permit secondary small displacements between them.

It will therefore be understood from the two previous examples that the joint according to the invention is of particularly advantageous use in all cases where it is necessary to absorb not only the relative angular displacements or oscillations about the longitudinal axis of the pivotal joint but also small displacements about any axes.

The devices described above may also be employed advantageously for forming other various pivots and pivotal joints usually present in automobile vehicles. In the case of the application of the invention to the pivotal joints of suspension springs and/or spring shackles and it is further observed that when the movements about the pivoting shaft exceed a certain amplitude (in degrees), the resistance offered by the interposed elastic material increases much more rapidly than in proportion to the amplitude.

As a consequence, at the end of the stroke, which, when an obstacle is met corresponds to the limit of absorption of the springs, a buffer effect is produced which is capable of effectively assisting the springs to either prevent the shock upon the axles or to considerably decrease it.

It is to be noted that in order that ordinary pivotal joints may be easily replaced by joints constructed according to the invention, provision is also made, according to the invention, for constructing an arrangement comprising a socket, a pivot and interposed material for the inner member acts as the pivot and the outer member as the socket.

The invention of course is not limited to the precise order of steps set forth in the single example given either as regards the assembling of the various elements or as to the particular point in the method at which, or in the manner that the lubricant is provided to the parts.

I claim:

A method of manufacturing oscillating joints which comprise an elastic material forced between two concentrically disposed inner and outer members by virtue of a lubricant and thus forming an annulus the radii of which are much smaller than those of the elastic material prior to insertion, the said method including providing the members immediately before insertion of the elastic material with soapy water as a lubricant having a temporary action, the lessening of the lubricating action being assisted by its spreading between the rigid surfaces of the said inner and outer members and the increasing surface of the elastic material and by the simultaneously increasing pressure between these surfaces, the durability of this lubricating action being sufficient for assisting the insertion of the elastic material.

LEON THIRY. [L. S.]